Oct. 30, 1962  N. H. NYE ET AL  3,060,499
APPARATUS FOR MAKING ELONGATED PLASTIC ARTICLES
Filed Nov. 29, 1960  3 Sheets-Sheet 1
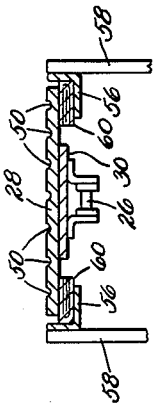
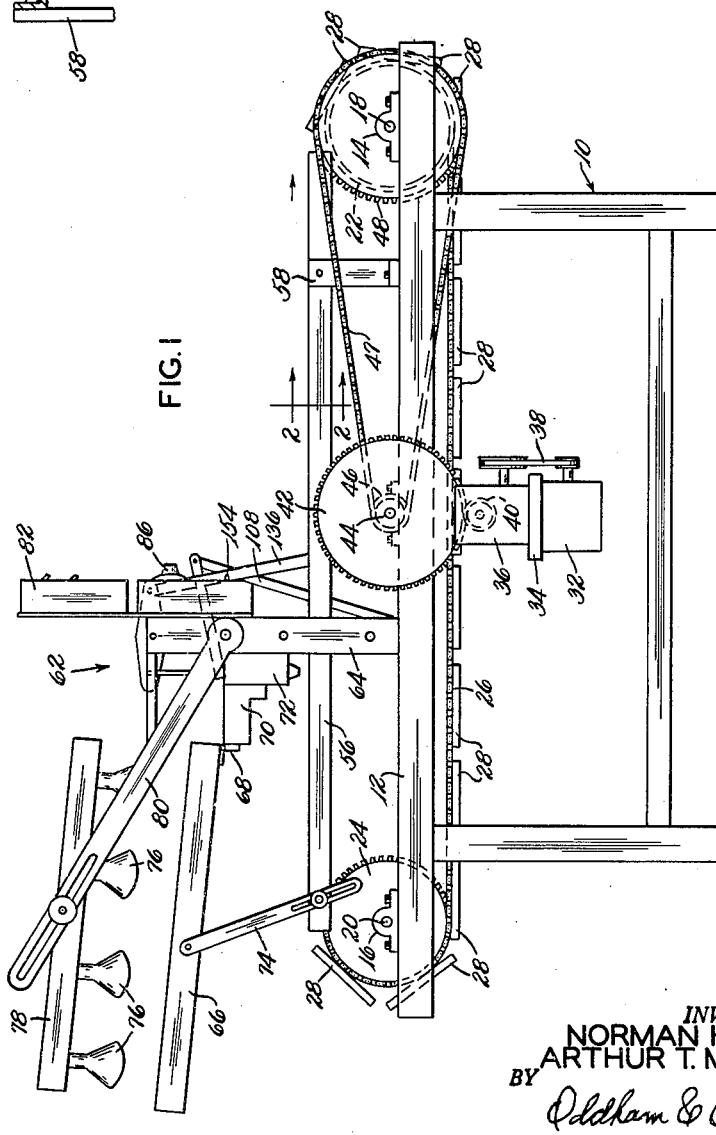
INVENTORS
NORMAN H. NYE
ARTHUR T. MEDKEFF
BY Oldham & Oldham
ATTYS.

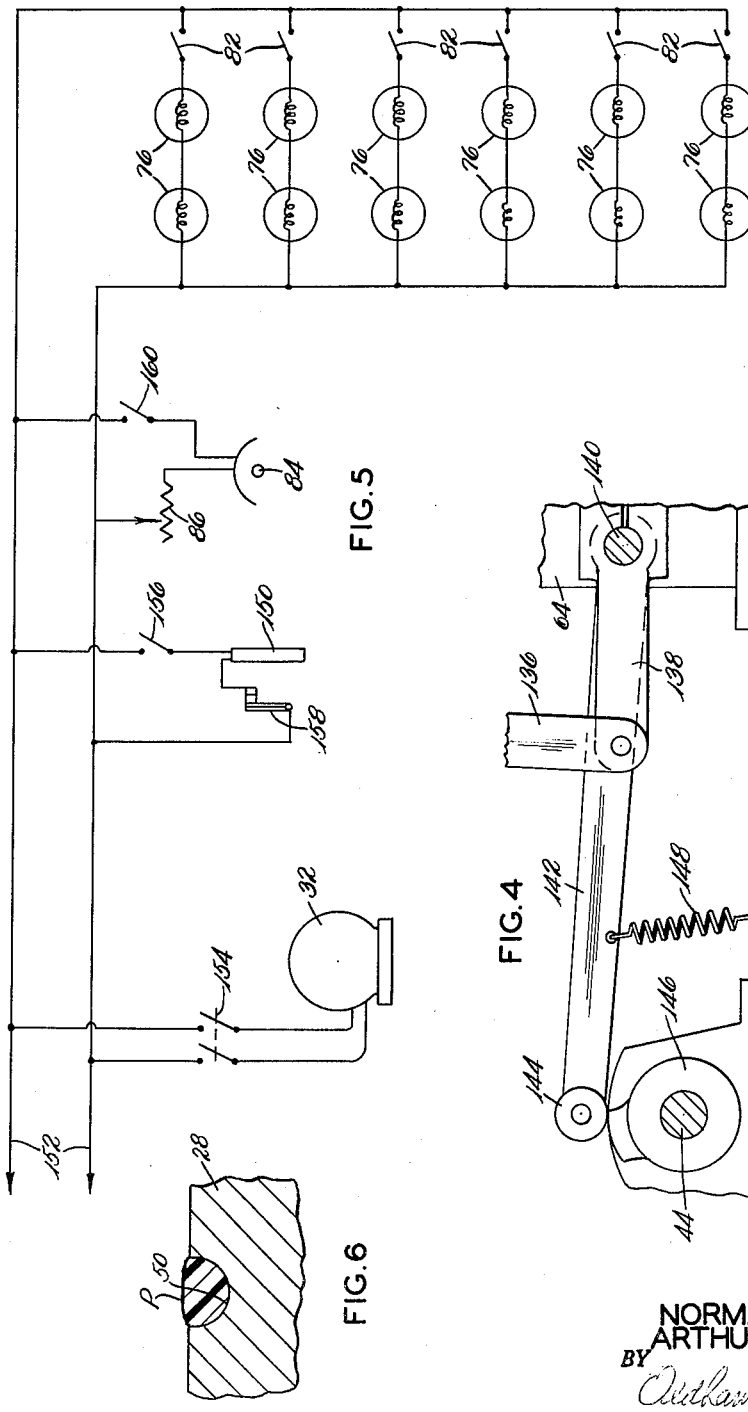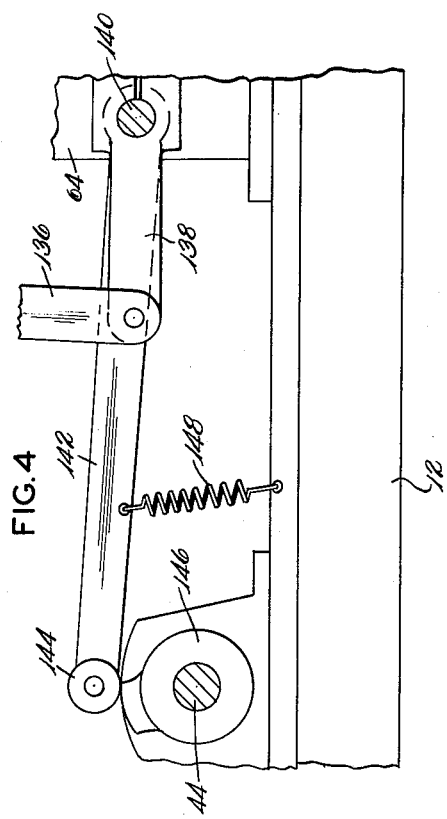

United States Patent Office 3,060,499
Patented Oct. 30, 1962

3,060,499
APPARATUS FOR MAKING ELONGATED
PLASTIC ARTICLES
Norman H. Nye, Cuyahoga Falls, and Arthur T. Medkeff, Akron, Ohio, assignors to Nicholas and Cosma Creme
Filed Nov. 29, 1960, Ser. No. 72,486
7 Claims. (Cl. 18—4)

This invention relates to apparatus for making elongated plastic articles, and, more particularly, is concerned with substantially automatic apparatus for making artificial night crawlers, fishing worms, and the like, from thermoplastic materials.

It is the general object of the invention to provide automatic apparatus for continuously melting thermoplastic material and for continuously depositing the material in elongated open-top molding grooves contained in continuously moving molds, with mechanism for feeding a measured charge of liquid plastic into each molding groove.

Another object of the invention is the provision of apparatus of the character described which is relatively inexpensive, rapid in operation, requires a minimum of operator attention, and which is durable and long-wearing.

Another object of the invention is the provision of apparatus for continuously moving molds in a predetermined path, each mold having a plurality of elongated molding grooves formed in the upper face thereof, each molding groove being of a variable cross section, and with mechanism for automatically feeding a relatively viscous thermoplastic material into the variable area molding groove in an amount to fill the groove in a substantially uniform manner.

Another object of the invention is to provide apparatus of the type described and wherein a plurality of molds are fed in turn in a predetermined path, each mold having a plurality of elongated openings whose axes extend in the direction of the mold travel, together with means for discharging relatively viscous thermoplastic material through a nozzle into each mold opening as the opening passes beneath the nozzle, and with valve means associated with the nozzle for starting and stopping the flow of the plastic therethrough so that the plastic flows into the mold opening only during the time that the opening is passing beneath each nozzle.

The foregoing objects of the invention, and other objects which will become apparent as the description proceeds, are achieved by the provision in combination, of a mold having an elongated article forming opening in its upper face, the opening varying in cross-sectional area along its length, means for moving the mold horizontally in the direction of the axis of the opening, a cylinder, a discharge nozzle on the cylinder, positioned above the opening in the mold, means for supplying the cylinder with melted but viscous thermoplastic material, a piston in the cylinder, a valve in the discharge nozzle, means for opening the valve as the opening in the mold moves under the nozzle for closing the valve as the end of the opening in the mold moves under the nozzle, and means for moving the piston in the cylinder to discharge the material from the cylinder into the opening in the mold when the valve is open, said means varying the speed of movement of the piston so as to uniformly fill the varying cross section of the opening in the mold.

For a better understanding of the invention reference should be had to the accompanying drawings wherein FIG. 1 is a side elevation of an apparatus incorporating the principles of the invention;

FIG. 2 is a transverse vertical cross-sectional view illustrating the guiding means for supporting the molds during their passage under the plastic feeding apparatus;

FIG. 4 is a view similar to FIG. 3 but illustrating the cam and linkages controlling the operation of the valve means associated with each nozzle;

FIG. 5 is a schematic wiring diagram of the apparatus, and

FIG. 6 is an enlarged cross-sectional view through the mold with the molded plastic therein.

Figure 3:
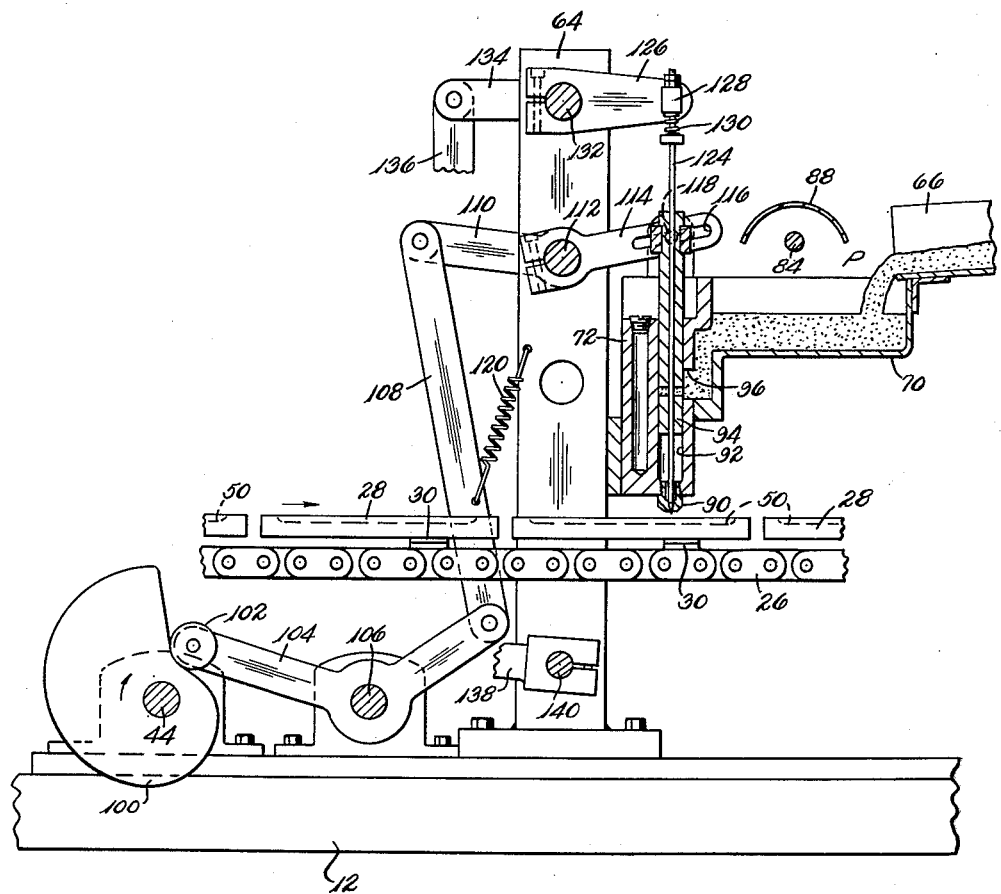
FIG. 3 is a fragmentary longitudinally vertical sectional view of a portion of the apparatus and particularly illustrating the plastic feeding mechanism and one of the cams and linkages controlling the plunger feeding movement.

In the drawings, the numeral 10 indicates generally a base supporting side rails 12 in turn carrying bearing blocks 14 and 16 journalling transversely extending shafts 18 and 20 at each end of the side rails 12. Positioned centrally of the shaft 18 is a relatively large sprocket gear 22, and shaft 20 likewise carries at its center a large sprocket gear 24, and over these sprocket gears 22 and 24 is trained an endless chain 26 which serves to carry a plurality of molds 28 in the manner best seen in FIGS. 2 and 3. FIG. 3 in particular illustrates how each mold 28 is secured, as at 30 to one set of links of the chain so that the molds 28 can tilt as they pass around the sprockets 22 and 24.

Suitable means are provided for continuously moving the molds 28, and these means may take the form of an electric motor 32 mounted underneath a platform 34 carried at the side of and beneath one side rail 12. The platform 34 carries a gear reducer 36 which is driven, as by a V-belt 38, from the motor 32, and with the output of the gear reducer driving from a pinion gear 40 to a large gear 42 secured to the end of a shaft 44 journalled transversely of the side rails 12. A small sprocket 46 carried by the shaft 44 drives by a chain 47 a large sprocket 48 mounted on shaft 18 and substantially covering sprocket 22 in the view thereof shown in FIG. 1.

Each mold 28 is in the form of a substantially flat plate having elongated molding grooves 50 formed in its upper surface and with the axes of the grooves extending in the direction of the travel of the mold. It will be seen from FIGS. 2 and 3 that each molding groove 50 is upwardly open, but as best shown in FIG. 3 is of a varying size cross-sectionally from one end of the molding groove to the other. For example, in the manufacture of a night crawler or fishing worm the tail of the worm tapers off to a progressively smaller cross section and there is also a band about one-quarter of the way back from the head of the worm, this band being of somewhat larger diameter than the rest of the body.

It should be understood that each mold opening or groove 50 is formed with laterally extending small ridges to simulate the body of the fishing worm so that each mold opening or groove is a true simulation of the night crawler type of fishing worm, so that when plastic is poured therein it will take the contour of the mold opening and simulate with great detail the appearance of the fishing worm. As evident from FIG. 6, it is not necessary to mold the plastic P extending slightly above the base of the mold which takes a relatively smooth and flat form inasmuch as this surface looks very much like the flat undersurface of a fishing worm.

FIG. 2 illustrates that during the travel of the molds 28 with the molding grooves 50 uppermost that the molds are supported for flat guided travel by means of angle irons 56 extending horizontally at each mold edge, the angle irons being carried by uprights 58 fastened to the side rails 12. Wooden strips 60 secured to the under-edges of each mold 28 act as glides for the mold on the angles 56.

The plastic feed mechanism associated with the apparatus is indicated as a whole by the numeral 62, this being mounted upon uprights 64 secured to the side rails 12. The feed mechanism includes a shallow metal pan 66 for receiving the plastic material to be melted, with the pan 66 being hinged at 68 to a reservoir 70 carried by a nozzle block 72 mounted between the uprights 64. A pair of adjustable braces 74 positioned between the pan 66 and the guide angles 56 allow the melting pan 66 to be raised or lowered so that the melted plastic material is given a controlled flow from the pan 56 by gravity into the reservoir 70.

A battery of infra-red heating lamps 76 are mounted on a support plate 78 above the melting pan 66 by means of braces 80 extending from the upright 64 so that it is possible to adjust the distance between the heating lights 76 and the melting pan 66. Electric switching controls 82 for the lights 76 are mounted between the uprights 64.

Now having reference to FIG. 3 of the drawings, the plastic material P received in the pan 66 flows into the reservoir 70 to form a liquid pool therein in the manner illustrated, this liquid pool being kept to the proper temperature and viscosity by a quartz rod heater 84 whose temperature is controlled by a rheostat 86, the rod 84 usually having a reflector 88 associated therewith.

The reservoir 70 is connected to the nozzle block 72 extending transversely of the apparatus and having a plurality of nozzles 90 thereon, the number of nozzles being equal to the number of molding grooves 50. Each nozzle 90 is positioned directly above and closely adjacent to a molding groove 50 in each mold 28. Each nozzle 90 is formed at the bottom of a cylindrical opening 92 slidably receiving a plunger 94, with each plunger 94 being adapted to be raised vertically to open a port 96 connected to the liquid plastic P in the reservoir 70, and with the plunger 94 thereafter being moved downwardly to discharge the plastic P through the nozzle 90 into the mold groove or opening 50.

The vertical reciprocating movement of each plunger 94 is adapted to be controlled by means of a cam 100 mounted on the shaft 44. The cam 100 engages with a roller 102 carried upon the end of a bell crank 104 which is pivotally mounted upon a rock shaft 106 journalled on the side rails 12, and with the other end of the bell crank 104 being pivotally connected by a link 108 with an arm 110 secured to a shaft 112 supported between the uprights 64. Secured to the shaft 112 in longitudinal alignment with each plunger 94 is an arm 114 having a slot 116 in its end slidably receiving a pin 118 secured to the upper end of each plunger 94. A tension spring 120 extending between an upright 64 and the link 108 holds the roller 102 against the cam 100.

The valving means for each nozzle 90 takes the form of a needle valve pin 124 which extends slidably through each plunger 94 and out the top thereof and is pivotally secured to an arm 126 by a lost motion connection 128, with the needle valve pin 124 being spring-biased downwardly by compression spring 130. The arms 126, one for each needle valve pin 124, are secured to a shaft 132 extending between the uprights 64. The shaft 132 is rocked by means of an arm 134 secured to its end and connected by a link 136 to an arm 138 (see FIG. 4) secured to shaft 140 journalled between the side rails 12. The shaft 140 is adapted to rocked by means of a long lever arm 142 secured to it and carrying at its other end a cam roller 144 engaging with a cam 146 likewise carried by shaft 44. A tension spring 148 extending between the lever arm 142 and a side rail 12 serves to hold the cam roller 144 in engagement with the cam 146.

The nozzle block 72 is heated at several places along its width by means of rod-type electric heaters 150 which are usually thermostatically controlled so as to maintain the proper consistency of flow of the plastic P through the nozzles 90.

FIG. 5 illustrates a typical wiring diagram for the apparatus wherein is illustrated an electric input 152 adapted to be connected through switching means 154 to electric motor 32, through switching means 156 to heaters 150 controlled by a thermostat 158, through switching means 160 and rheostat 86 to heater rod 84, and to the heating lamp 76 through switches 82.

In the operation of the apparatus as described, the plastic material P to be molded is placed in the melting tray 66, the heating lights 76 are energized and the material P is melted down and flows by gravity into the reservoir 70. The temperature of the material P in the reservoir is controlled by the heating rod 84 and by the heating rods 150 in the nozzle block 72, and in this region of the apparatus the material P is quite liquid and flowable.

Motor 32 is next energized to begin to move the molds 28 in turn under the nozzles 90. Now assuming that the plurality of plungers 94 have been raised so that liquid plastic material P has flowed into all the cylinders 92, as the ends of the mold grooves or openings 50 move under each nozzle 90, needle valve pins 124 raise by means of the linkages shown in FIGS. 3 and 4 under the action of cam 146. Immediately upon the opening of the needle valve pins 124 the plungers begin to move downwardly under the action of cam 100 to discharge the plastic material P out of each nozzle 90 and into the mold grooves or openings 50 positioned underneath of each nozzle.

The movement of the plungers 94 downwardly is controlled by the drop of the cam 100 to extrude a measured and changing amount of plastic material into the mold grooves or openings 50. Thus in the region of the band on the worm to be produced an extra amount of material is extruded, and as the cross-sectional diameter of the worm decreases toward its tail a gradually less amount of plastic is extruded through each nozzle 90 so that each mold opening 50 is properly filled over its entire length. As the ends of the mold openings 50 pass under the nozzles 90 the needle valve pins 124 are closed and the plungers 94 are raised relatively rapidly. Now with the plungers 94 raised additional plastic material P flows through the ports 96 and into each cylinder 92 beneath the plungers 94. The apparatus is now ready to repeat the operation when the next mold 28 moves underneath the nozzle block 72.

It will be understood that the molds 28 act to rather rapidly chill at least the surface portion of the liquid plastic P discharged into the mold grooves or openings 50 thereof so that it is necessary to effect the controlled discharge of the plastic fed to the mold openings all in the manner described. In other words, the plastic cannot be made so liquid that it will seek its own level in the varying cross section mold opening. The plastic continues to cool in the mold, but the molded articles are normally stripped from the mold only after the articles carry with molds around the underside of the apparatus and are again brought upright. Thus, the molded articles are stripped from the molds just before the molds again pass under the plastic discharge nozzles.

Although the apparatus of the invention is adapted to be used with a variety of plastic materials, one material which has been found to be particularly suitable is a vinyl plastisol which has already been fused and then granulated.

While a certain representative embodiment and details have been shown for the purpose of illustrating the invention, it will be apparant to those skilled in this art that various changes and modifications may be made therein without departing from the spirit or scope of the invention.

What is claimed is:

1. Apparatus for producing elongated plastic bodies which comprises a plurality of molds having elongated openings in their faces, means continuously moving the molds through an endless path with the faces of the molds uppermost during at least a portion of the endless movement and with the axes of the mold openings extending in the direction of the mold movement, open tray means for receiving granulated plastic, means for controlling the horizontal position of the tray means, means for controllably melting the plastic in the tray means, pocket means for receiving the melted plastic running off the tray means, a plurality of cylinders equal in number to the number of mold openings, each cylinder being positioned in vertical alignment with a mold opening, a piston in each cylinder, each cylinder having a port connecting with the pocket means and adapted to be opened and closed by movement of the piston, a discharge nozzle on each cylinder above a mold opening, cam means for moving each piston downwardly in its cylinder to first close the port and to then discharge liquid plastic through the nozzle at a controlled and varying rate into the opening in the mold face moving beneath the nozzle and for then moving the piston upwardly to again open the port, needle valve means for closing each nozzle and operating through the piston, and means for opening the valve means as the opening in the mold face starts under the nozzle and for closing the valve means as the end of the opening in the mold face moves under the nozzle, the means moving the piston downwardly operating when the valve means are open.

2. Apparatus for producing elongated plastic bodies which comprises a plurality of molds having elongated openings in their faces, means continuously moving the molds through an endless path with the faces of the molds uppermost during at least a portion of the endless movement and with the axes of the mold openings extending in the direction of the mold movement, means for receiving granulated plastic, means for controllably melting the plastic in the receiving means, a plurality of cylinders equal in number to the number of mold openings connected to the plastic receiving means, each cylinder being positioned in vertical alignment with a mold opening, a piston in each cylinder, each cylinder having a port connecting with the plastic receiving means and adapted to be opened and closed by movement of the piston, a discharge nozzle on each cylinder above a mold opening, cam means operatively connected to the means continuously moving the molds for moving each piston downwardly in its cylinder to first close the port and to then discharge liquid plastic through the nozzle at a controlled and varying rate into the opening in the mold face moving beneath the nozzle and for then moving the piston upwardly to again open the port, needle valve means for closing each nozzle and operating through the piston, and means for opening the valve means as the opening in the mold face starts under the nozzle and for closing the valve means as the end of the opening in the mold face moves under the nozzle, the means moving the piston downwardly operating when the valve means are open.

3. Apparatus for producing elongated plastic bodies which comprises a plurality of molds having elongated openings in their faces, means continuously moving the molds through an endless path with the faces of the molds uppermost during at least a portion of the endless movement and with the axes of the mold openings extending in the direction of the mold movement, means for receiving granulated plastic, means for controllably melting the plastic in the receiving means, a plurality of cylinders equal in number to the number of mold openings connected to the plastic receiving means, each cylinder being positioned in vertical alignment with a mold opening, a piston in each cylinder, each cylinder having a port connecting with the plastic receiving means and adapted to be opened and closed by movement of the piston, a discharge nozzle on each cylinder above a mold opening, means operatively connected to the means continuously moving the molds for moving each piston downwardly in its cylinder to first close the port and to then discharge liquid plastic through the nozzle into the opening in the mold face moving beneath the nozzle and for then moving the piston upwardly to again open the port, needle valve means for closing each nozzle and operating through the piston, and means for opening the valve means as the opening in the mold face starts under the nozzle and for closing the valve means as the end of the opening in the mold face moves under the nozzle, the means moving the piston downwardly operating when the valve means are open.

4. Apparatus for producing elongated plastic bodies which comprises a plurality of molds having elongated openings in their faces, means continuously moving the molds through an endless path with the faces of the molds uppermost during at least a portion of the endless movement and with the axes of the mold openings extending in the direction of the mold movement, means for receiving granulated plastic, means for controllably melting the plastic in the receiving means, a plurality of cylinders equal in number to the number of mold openings connected to the plastic receiving means, each cylinder being positioned in vertical alignment with a mold opening, a piston in each cylinder, each cylinder having a port connecting with the plastic receiving means and adapted to be opened and closed by movement of the piston, a discharge nozzle on each cylinder above a mold opening, means operatively connected to the means continuously moving the molds for moving each piston downwardly in its cylinder to first close the port and to then discharge liquid plastic through the nozzle into the opening in the mold face moving beneath the nozzle and for then moving the piston upwardly to again open the port, valve means for closing each nozzle, and means for opening the valve means as the opening in the mold face starts under the nozzle and for closing the valve means as the end of the opening in the mold face moves under the nozzle, the means moving the piston downwardly operating when the valve means are open.

5. The combination defined in claim 1 wherein the pocket means and cylinders are separately and controllably heated.

6. In a molding apparatus, a cylinder having an opening in its sidewall connecting the cylinder with material to be molded so that the material can enter the cylinder, a piston reciprocating in the cylinder to open and close the openings, a discharge nozzle in the base of the cylinder, cam means for moving the piston into the cylinder to first close the opening and to then discharge the material through the nozzle at a controlled and varying rate and for then moving the piston upwardly to again open the opening, needle valve means extending axially through the piston for closing the nozzle and means operatively connected to the cam means for opening and closing the valve means.

7. Apparatus for producing elongated plastic bodies which comprises a plurality of molds, means connecting the molds in end to end relationship, each mold having at least one elongated opening in its face extending substantially parallel with the end to end molds, means continuously moving the molds through an endless path with the faces of the molds uppermost during at least a portion of the endless movement with the axes of the mold openings extending in the direction of the mold movement, means for melting and storing plastic material, cylinder means equal in number to the elongated openings in a single mold connected to the means for storing the plastic material, said cylinder means being positioned in vertical alignment with the mold opening, and having a port connecting with the plastic storing means, piston means in said cylinder means movable to open and close the port, a discharge nozzle in the cylinder means above the mold opening, cam means operatively connected to the means for moving the molds for moving the piston means downwardly into the cylinder means to first close the port and then to discharge liquid plastic through the nozzle at a controlled and varying rate into the opening in the mold face moving beneath the nozzle and then moving the piston upwardly to again open the port, needle valve means for closing the nozzle and operating through the piston, and means for opening the valve means as the opening in the mold face starts under the nozzle and for closing the valve means as the end of the opening in the mold face moves under the nozzle, the means moving the piston downwardly operating when the valve means are open.

References Cited in the file of this patent

UNITED STATES PATENTS

| | | |
|---|---|---|
| 1,738,612 | Recht | Dec. 10, 1929 |
| 2,287,356 | Newman | June 23, 1942 |
| 2,359,840 | Goessling | Oct. 10, 1944 |
| 2,428,878 | Johnson | Oct. 14, 1947 |
| 2,505,540 | Goldhard | Apr. 25, 1950 |
| 2,627,086 | Hallenbeck | Feb. 3, 1953 |
| 2,754,545 | Henry | July 17, 1956 |
| 2,827,665 | Rogers et al. | Mar. 25, 1958 |
| 2,834,051 | Rekettye | Dec. 23, 1958 |
| 2,865,051 | DeMattia et al. | Dec. 23, 1958 |
| 2,923,029 | Harris et al. | Feb. 2, 1960 |
| 2,931,063 | Harris | Apr. 6, 1960 |
| 2,948,019 | Petersen | Aug. 9, 1960 |
| 2,964,789 | Conder et al. | Dec. 20, 1960 |